United States Patent [19]

Brendel

[11] 4,020,686
[45] May 3, 1977

[54] FORCE MEASURING APPARATUS
[75] Inventor: Albert E. Brendel, Lake Orion, Mich.
[73] Assignee: Lebow Associates, Inc., Troy, Mich.
[22] Filed: Jan. 5, 1976
[21] Appl. No.: 645,059
[52] U.S. Cl. .............................. 73/141 A; 177/211
[51] Int. Cl.² ......................................... G01L 5/00
[58] Field of Search .......... 73/141 A; 177/211, 229
[56] References Cited
UNITED STATES PATENTS

| 3,240,281 | 3/1966 | Schaevitz | 73/141 A |
| 3,512,595 | 4/1970 | Laimins | 73/141 A |
| 3,805,604 | 4/1974 | Ormond | 73/141 A |

Primary Examiner—James J. Gill
Assistant Examiner—Anthony V. Ciarlante

[57] ABSTRACT

A novel flexure-based transducer is capable of measuring forces along a first axis and moments about a second axis perpendicular to the first axis, using strain-gaged cantilever beams. The configuration facilitates scaling for selected sensitivity to particular inputs. A second embodiment permits the strain gages to be completely sealed from the environment. Also disclosed is a platform weighing system of the force transferral type using four of the novel flexure members with only a single load cell, and permitting the relative sensitivity of each flexure member to be readily adjusted to provide equal sensitivity irrespective of the location of the applied load on the platform.

13 Claims, 8 Drawing Figures

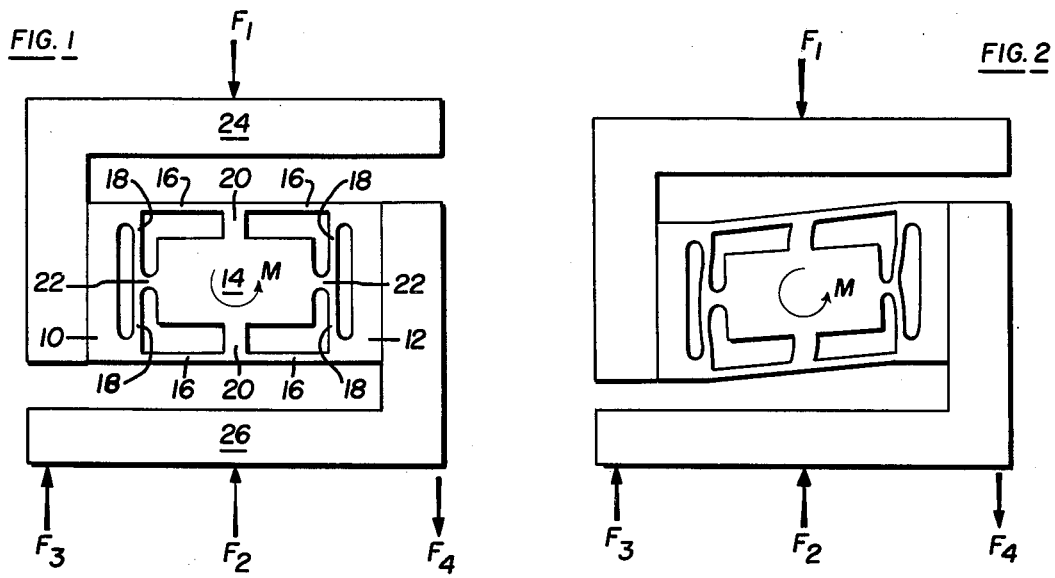
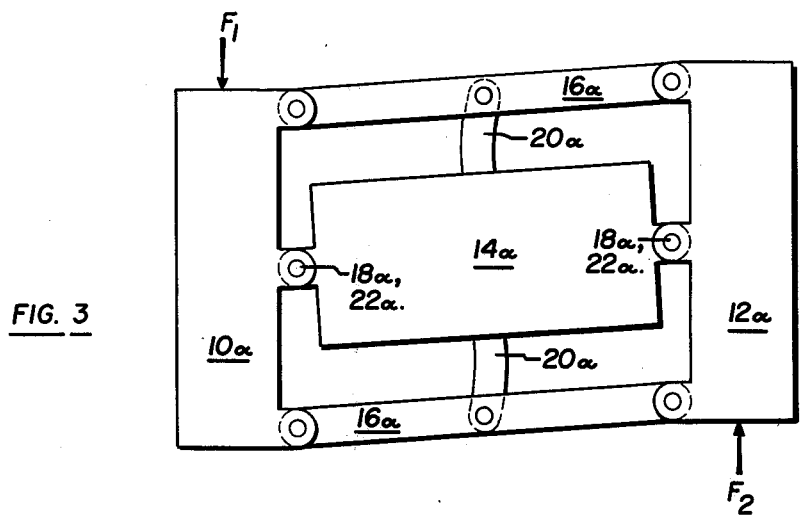
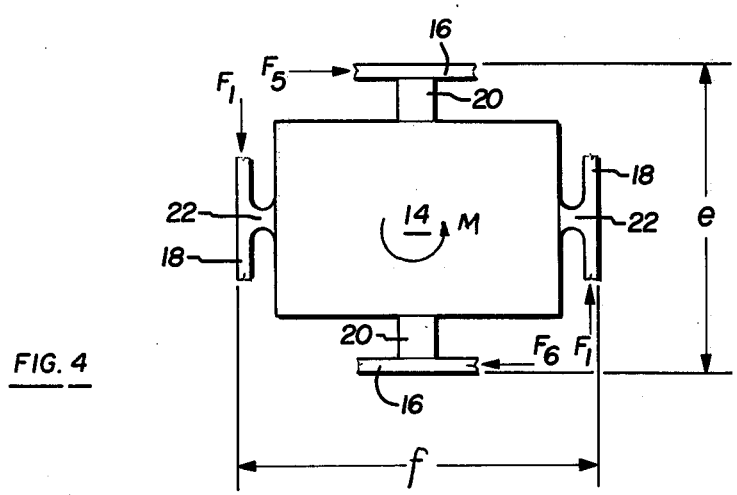

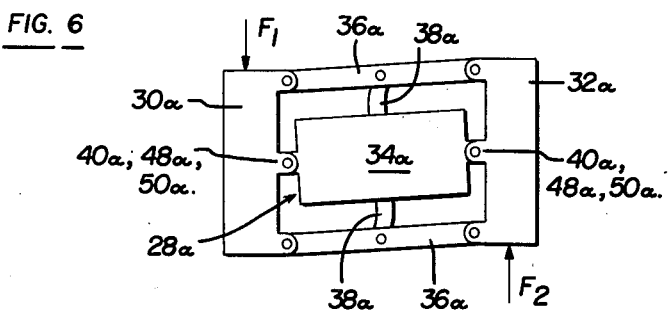
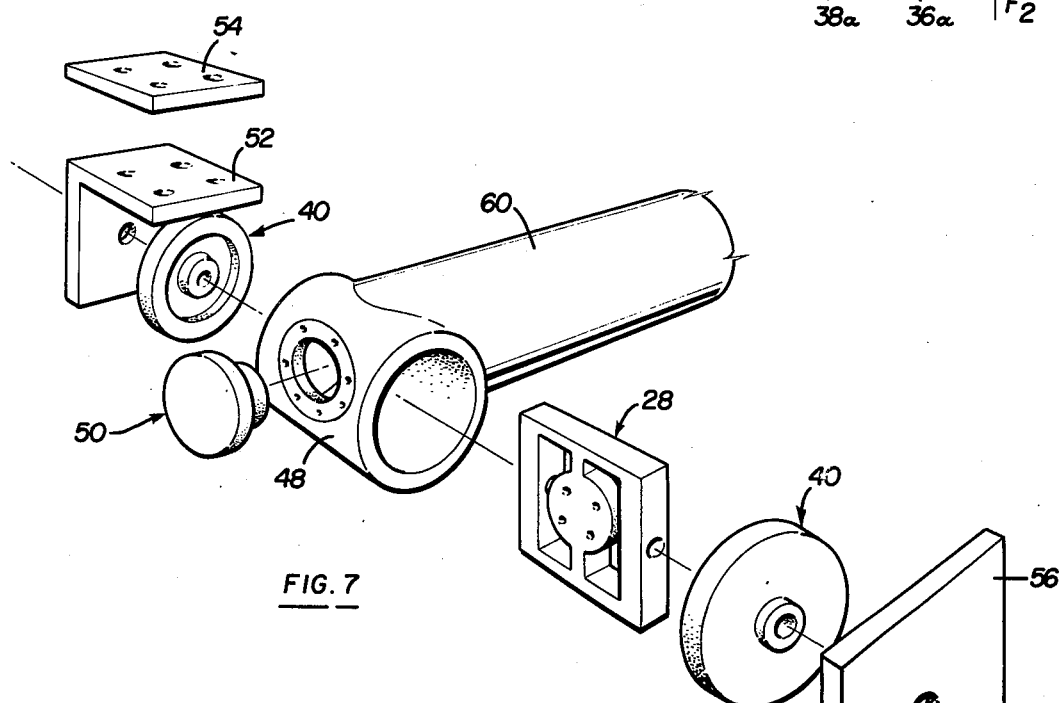
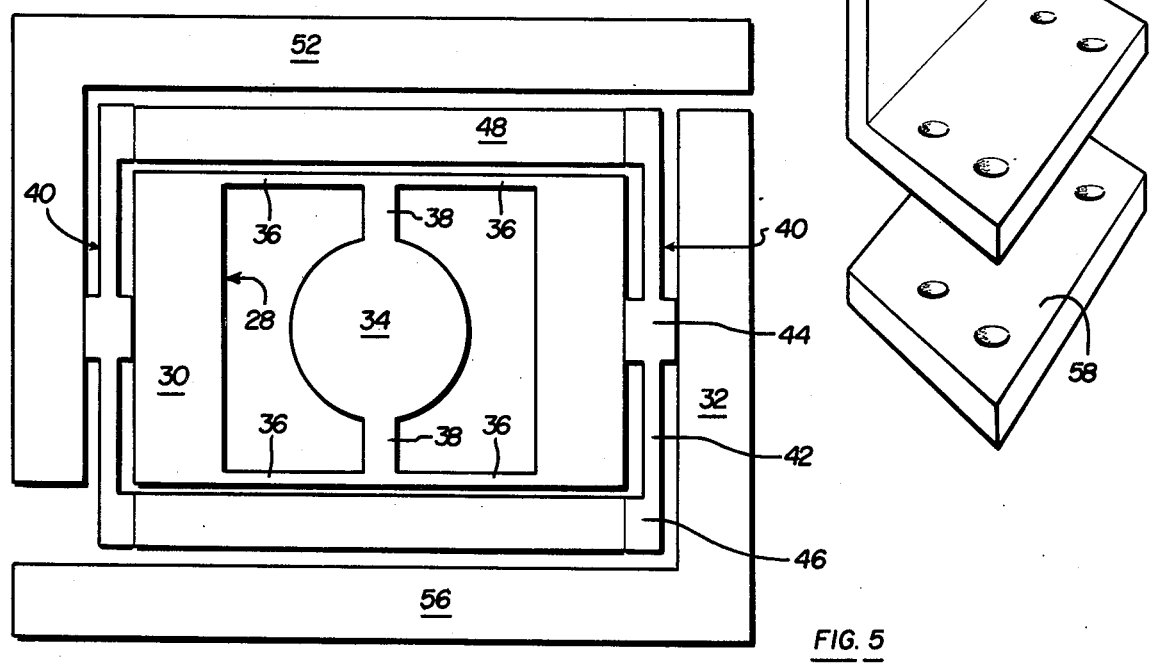

FORCE MEASURING APPARATUS

BACKGROUND OF INVENTION

This invention is concerned with improvements in low profile electronic type platform weighing systems. A first type system which has been used in the past employs a platform supported by several load cells whose outputs are averaged electrically to allow forces to be measured over a large area of the platform. The advantage of such a system is that the relative sensitivities of each load cell can be easily adjusted electrically, permitting the scale to have equal sensitivity irrespective of the location of the load on the platform. This adjustment is referred to in the trade as "corner sealing." The disadvantage of the multiple load cell system is that it necessarily results in de-rating of the individual load cells to protect them against high loads created by off-center application of the force to the platform. In the worst case, where the load is applied directly over one corner of a platform supported by a load cell at each of its four corners, mathematical analysis demonstrates that each scale must be capable of withstanding three-fourths of the total applied load, thereby decreasing the sensitivity of the system in a situation where the load is applied centrally on the platform with each of the load cells supporting only one quarter of the load. Thus, the potential accuracy of the multiple load cell system is reduced.

A second type of platform scale employs the well-known principles of flexures, pivots, levers and torque tubes to mechanically combine the forces applied to the platform, and thereby permits the measurement of forces with a single load cell which does not have to be derated as described above. Conventional lever systems employ pivots, bearings and knife edges which continuously wear and must be periodically filed, aligned and replaced. It is therefore inconvenient and costly to maintain and mechanically adjust the various lever arm lengths to achieve corner sealing and to maintain accuracy, and knife edge systems also introduce problems from lateral loading conditions.

These problems inherent in conventional lever systems are eliminated by replacing the pivots and bearings with ribbon-like beams of steel called flexures. Flexures, which are known in the art, have no moving parts and require no adjustment or maintenance. The load on the platform is transmitted to the lever system through the flexure.

It is the primary object of this invention to provide an improved platform weighing system which combines the advantages of both multiple load cell systems and flexure-based lever type force transferral systems employing single load cells, without incurring the disadvantages normally inherent in either of such systems. It is a further object to provide an improved flexure element which can be readily modified to change its sensitivity, and which is useful either as a flexure element in a platform weighing system or as a transducer.

BRIEF DESCRIPTION OF THE DRAWINGS

FIG. 1 is a side elevation of a novel flexure element according to the present invention.

FIG. 2 is a side view, similar to FIG. 1, but showing exaggerated deflection of the flexure element under load.

FIG. 3 is a side view of an analogous model of the structure of FIGS. 1 and 2, shown in its deflected condition.

FIG. 4 is a fragmentary side view of a portion of the structure of FIG. 1.

FIG. 5 is a side view of a modified form of the flexure element of FIG. 1.

FIG. 6 is a side view of an analogous model of the structure of FIG. 5.

FIG. 7 is an exploded perspective view of a portion of a platform weighing system utilizing the flexure element of FIG. 6.

DETAILED DESCRIPTION OF THE INVENTION

Figure 8:
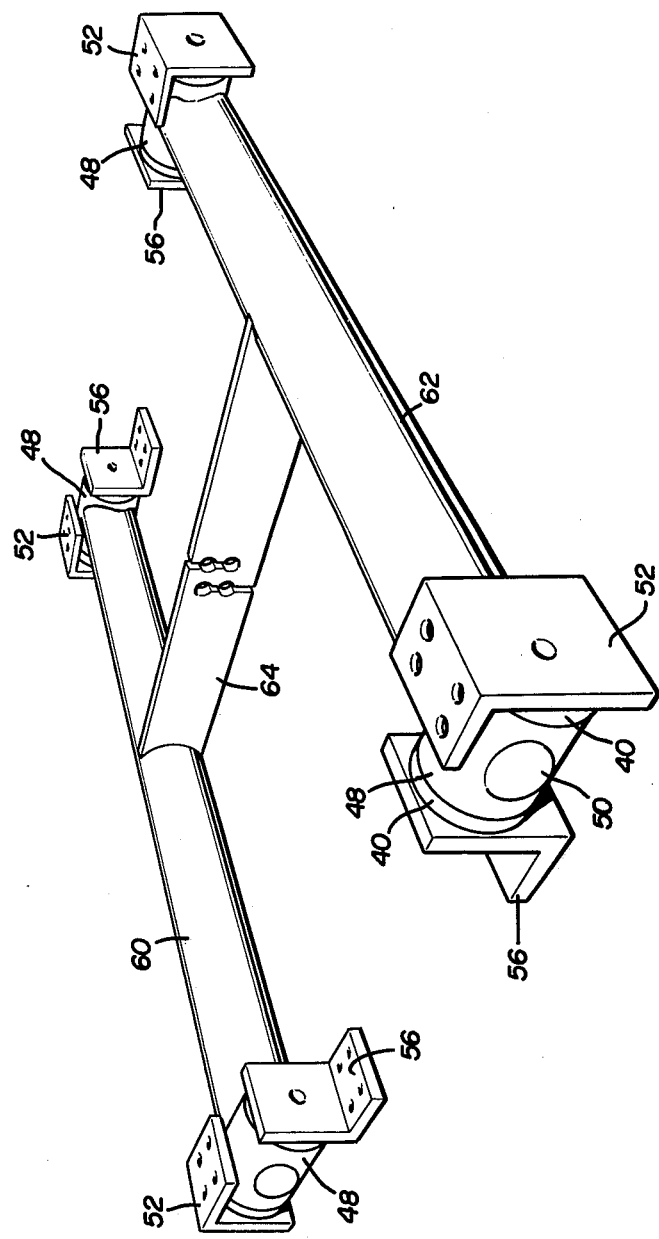
FIG. 8 is a perspective view of the entire platform weighing system utilizing the structure of FIG. 7.

Referring to FIG. 1, the flexure element or transducer comprises rigid force input structure 10 and force output structure 12, with an intermediate force or moment carrying structure 14. These structures are interconnected by four horizontal flexural elements 16, four vertical flexural elements 18, a pair of force measuring members 20 and a pair of connecting structures 22. A force input bracket 24 is rigidly connected to force input structure 10, while a force output bracket 26 is similarly connected to force output structure 12, these brackets merely serving as convenient means for applying the input and reaction forces to the structure without affecting the operating principles.

The construction of FIG. 1 is adapted to measure forces applied along the axis defined by $F_1$ and $F_2$, as well as to measure the magnitude of moments M applied about the axis perpendicular to the first axis, that is, the axis perpendicular to the plane of FIG. 1. The properties and dimensions of flexural elements 16 and 18 and selected to provide high yieldability or flexibility to bending forces transverse to their thin dimension (i.e., vertical forces on elements 16 and horizontal forces on elements 18, as viewed in FIG. 1) while providing stiffness or rigidity to forces applied in the plane of the flexural elements.

If it is assumed that $F_1$ is an input force, to be resisted by $F_2$, or alternatively, that M is an externally applied moment to be reacted against by forces $F_3$ and $F_4$, it will be seen that force or moment carrying structure 14 will tend to rotate counter-clockwise. The properties of the various linking structures are such that only force measuring members 20 are capable of providing any substantial resistance to such rotation. The pattern of deflection of the transducer, in response to such applied forces or moments, is shown to an exaggerated degree in FIG. 2. Horizontal flexural elements 16 act as parallelogram links, maintaining input and output structures 10, 12, respectively, parallel to each other as input structure 10 moves vertically downward in response to the applied load. Because of this parallelogram-like action, the midpoints of the horizontal flexural elements 16 (i.e., the points at which force measuring members 20 intersect horizontal flexural elements 16) remain on a vertical line midway between input and output structures 10, 12. That being so, force measuring members 20 must bend as force or moment carrying structure 14 rotates. Similarly, such rotation produces bending of vertical flexural elements 18 due to their connection with connecting structure 22 which is rotating along with force or moment carrying structure 14.

FIG. 3 is a simplified or analogous model of the structure of FIG. 1, demonstrating the functions and response of the various elements to the applied load. Corresponding portions of the structure carry the same reference numerals, with the suffix $a$ applied. The parallelogram relationship of elements 10, 12 and 16 are evident, with pivot points representing the nature of their interconnection. Also evident is the pivot point function of vertical flexural elements 18 and connecting structure 22, allowing rotation of structure 14 relative to structures 10 and 12. The response of the structure to applied load $F_1$ (or moment M) can best be understood by picturing the pivot points which connect elements 16$a$ to members 20$a$ as having their lateral (left-right) position fixed. As structure 10$a$ moves downward relative to stationary structure 12$a$, structure 14$a$ must rotate counterclockwise, as permitted by the various pivot connections. However, the connection of upper elements 16$a$ and 20$a$ being unable to shift to the left, and the connection of lower elements 16$a$ and 20$a$ being unable to shift to the right, members 20 must bend as cantilevered beams.

If the device of FIG. 1 is to be utilized as a load cell, strain gages may be applied to the left and right sides of force measuring members 20. In such position, the strain gages will measure the bending of these members, which deflection is proportional to the rotation of structure 14, which is in turn proportional to the applied load to be measured, as is known by those skilled in the art. Those skilled in the art will recognize that alternative methods of measuring rotation of structure 14 relative to a reference point will also yield data proportionally responsive to the magnitude of the applied force or moment.

If, however, the device of FIG. 1 is to be used as a flexural member, for transferring applied loads to another point for measurement (such as will be described with reference to FIG. 8), then the inclusion of members 20 in the structure is optional. In fact, the responsiveness of the flexural member would be increased by their omission, since the torsional rigidity would decrease substantially.

FIG. 4 shows a free body diagram of the force or moment carrying structure 14. Since $F_1$ equals $F_2$, and $F_5$ equals $F_6$, solution of an equation which sums moments results in:

$$F_5 = \frac{(F_1)f + M}{e}$$

Since $e$ and $f$ are fixed distances, it can be seen that $F_5$ and $F_6$ (the forces which produce the bending in force measuring members 20) are proportional to the sum of the applied force $F_1$ and the applied moment M. The distance factors $e$ and $f$ allow convenient scaling of the relative magnitudes of the forces and/or moments measured by the structure.

For a given structure, sensitivity to applied forces, i.e., corner sensitivity in a platform scale, can be increased by filing the inside opposed faces of vertical flexural elements 18. Filing removes material from these faces, and thus increases the effective distance between opposite elements 18, increasing the length of dimension $f$. Similarly, to decrease corner sensitivity, the outside opposed faces of vertical flexural elements 18 may be filed to remove material and thereby decrease dimension $f$. Of coures, removal of material also affects sensitivity by modifying the stiffness of the beams. Sensitivity may also be changed, when members 20 are provided, by adjusting dimension $e$ as a result of removal of material from one or the other of the faces of horizontal flexural elements 16.

A modified form of the invention is shown in FIGS. 5–8. In this construction, the force carrying structure 28 comprises a force input member 30, force output member 32 and intermediate force or moment carrying structure 34, these elements being integrally formed with interconnecting horizontal flexural elements 36 and force measuring members 38. Vertical flexural elements 18 of the embodiment of FIGS. 1–4 have been here replaced by separate diaphragm structures 40, each of which comprises a vertical annular flexural element 42, a force transmitting boss 44 connected to the force input and output members 30, 32, and an annular connecting rim 46 which is connected to enclosing tube 48.

Thus, as best shown in FIG. 7, force carrying structure 28 may be fabricated as a separate integral element, which is completely sealed from the environment by its enclosure within tube 48 and diaphragm structures 40. Tube 48, in turn, is rigidly connected directly to intermediate force or moment carrying structure 34 by means of plug 50, which may be bolted to both elements.

Input bracket 52 transmits the applied load from platform 54 through force transmitting boss 44 of left hand diaphragm structure 40 and into the force input member 30. Similarly, the reaction force of the applied load is transmitted from force output member 32 through boss 44 of right hand structure 40 into output bracket 56, which may in turn be supported by a reacting base or floor. The degree of freedom of each diaphragm 42 is limited, because of the restraints of associated structure, to rotation about an axis perpendicular to the plane of the paper of FIG. 5 and passing through the associated boss 44.

FIG. 6 illustrates a structure which is analogous in function and operation to the structure of FIG. 5, corresponding elements being marked with the identical reference numerals to which the suffix $a$ has been applied. It will be noted that FIG. 6 is identical to FIG. 3, demonstrating the functional and operational similarity of the two embodiments. From FIGS. 5 and 7, however, it will be evident that the load-induced downward deflection of force input member 30 transmitted to and induces rotation of intermediate force or moment carrying structure 34 by means of diaphragm structure 40, enclosing tube 48 and plug 50, rather than by connecting elements 22 of the first embodiment.

If the structure of FIG. 5 is to be utilized as a load cell, then the strain gages may be mounted on the sides of force measuring members 38, where they respond to the load-induced bending of such members as in the manner of the first embodiment. As in the embodiment of FIG. 1, sensitivity can be modified by selective removal of material from the inner or outer faces of diaphragms 42, thereby changing dimension $f$, or (when member 38 is provided) by removal of material from flexural elements 36, thereby modifying dimension $e$.

If the structure of FIG. 5 is to be utilized in a platform scale as a flexural member to transfer the applied load to a single load cell, as shown in FIG. 8, then the load-induced rotation of force or moment carrying structure 34 is transmitted through torque tube 60 or 62, rigidly secured to tube 48, to connecting beam 64. The rotational deflection of tubes 60 and 62 (in opposite directions) induces an upward deflection at the center of connecting beam 64, which deflection may be detected by the single load cell employed in such an arrangement. Scales may be constructed to a variety of sizes, while employing the same flexural members merely by changing the dimensions of non-critical connecting elements 60, 62 and 64. While a platform employing four flexural members has been illustrated, it will be appreciated that the platform can be supported by two or more such members, each connected to a torque tube, with the torque tubes interconnected by a beam which sums their deflections.

It is to be understood that the flexural member of FIG. 1 may also be used as a flexural member in a platform scale such as is shown in FIG. 8, by rigidly connecting tube 60 to force or moment carrying structure 14 for rotation therewith.

This invention may be further developed within the scope of the following claims. Accordingly, the above specification is to be interpreted as illustrative of only two operative embodiments of the present invention, rather than in a strictly limited sense.

I now claim:

1. A flexural member for use in a force measuring system capable of measuring forces along a first predetermined axis and also moments about a second predetermined axis perpendicular to the first axis comprising:
first and second structures spaced from each other in the direction mutually perpendicular to said first and second axes, said first structure adapted to deflect in the direction parallel to said first axis in response to an applied force or moment to be measured, and said second structure being connected to a non-yieldable reaction member;
auxiliary means for preventing relative rotation between said first and second structures during relative movement of said structures in response to applied forces or moments to be measured, said auxiliary means comprising first and second spaced flexure elements each connected at its opposite ends to said first and second structures, said first and second flexure elements being substantially rigid in response to forces applied thereto in a direction parallel to said mutually perpendicular direction but being readily resiliently yieldable in response to forces applied thereto in a direction parallel to said first axis, thereby to establish in coaction with said first and second structures a four-sided structure which responds to applied forces or moments to be measured as a parallelogram with pivot connections between the sides;
a force carrying structure interconnecting said first and second structures, said force carrying structure being connected to said first and second structures by third and fourth spaced flexure elements, respectively, capable of permitting relative rotation between said force carrying structure and each of said first and second structures, said third and fourth flexure elements each being substantially rigid in response to forces applied thereto in a direction parallel to said first axis but being readily resiliently yieldable in response to forces applied thereto in a direction mutually perpendicular to said first and second axes.

2. The flexural member of claim 1 wherein said third and fourth flexure elements are so constructed and arranged that the effective distance therebetween can be readily modified by removal of material, thereby changing the sensitivity of the flexural member.

3. The flexural member of claim 1 wherein said first and second structures, said force carrying structure and said first, second, third and fourth flexural elements are all formed as a single integral unit.

4. The flexural member of claim 1 which further comprises resiliently yieldable means interconnecting said force carrying structure to a reference point and adapted to deflect in proportional response to the rotation of said force carrying structure relative to said first and second structures, whereby the deflection of said yieldable means is proportional to the magnitude of either a force to be measured which is applied to said first structure or a moment to be measured which is applied to said force carrying structure, whichever the case may be.

5. The flexural member of claim 4 wherein said first and second structures, said force carrying structure, said auxiliary means and said resiliently yieldable means are formed as a single integral unit fully enclosed within a chamber, said chamber being defined by two thinwalled diaphragms sealing the ends of a rigid sleeve, one of said diaphragms being connected to said first structure for movement therewith along said first axis, and the other of said diaphragms being connected to said second structure, said diaphragms functioning as said third and fourth and being flexure elements resiliently yieldable only in rotation about axes parallel to said second axis, and said sleeve being rigidly connected to said force-carrying structure so that said sleeve said force-carrying structure rotate together about said second axis in response to an applied force or moment to be measured.

6. A flexural member for use in a force measuring system capable of measuring forces along a first predetermined axis and also moments about a second predetermined axis perpendicular to the first axis comprising:
first and second structures spaced from each other in the direction mutually perpendicular to said first and second axes, said first structure adapted to deflect in the direction parallel to said first axis in response to an applied force or moment to be measured, and said second structure being connected to a non-yieldable reaction member;
a first pair of spaced flexure members each connected at its opposite ends to said first and second structures, said first pair of flexure elements being substantially rigid in a direction parallel to said mutually perpendicular direction but being readily resiliently yieldable in a direction parallel to said first axis, thereby to establish in coaction with said first and second structures a four-sided structure which responds to applied forces or moments to be measured as a parallelogram with pivot connections between the sides;
a force carrying structure interconnecting said first and second structures through a second pair of spaced flexure elements, one of said flexure elements of said second pair interconnecting said first structure with said force carrying structure and capable of permitting relative rotation therebetween about an axis parallel to said second predetermined axis, and the other flexure element of said second pair interconnecting said second structure with said force carrying structure and capable of permitting relative rotation therebetween about an axis parallel to said second predetermined axis;

the flexure elements of at least one of said pairs of flexure elements being so constructed and arranged that the effective distance between said pair can be readily modified by removal of material, thereby changing the sensitivity of the flexural member;

resiliently yieldable means interconnecting said force carrying structure to each of the flexure elements of said first pair of flexure elements and adapted to deflect in proportional response to the rotation of said force carrying structure relative to said first and second structures, whereby the deflection of said yieldable means is proportional to the magnitude of either a force to be measured which is applied to said first structure or a moment to be measured which is applied to said force carrying structure, whichever the case may be.

7. The flexural member of claim 6 wherein said first and second structures, said force carrying structure, said first and second pair of flexural elements and said resiliently yieldable means are all formed as a single integral unit.

8. A platform weighing system of the type characterized by a platform adapted to receive an object to be weighed, the platform spaced above an unyieldable supporting surface by four coplanarly arranged flexural members, comprising:
  a. each of said flexural members comprising:
    1. a first structure adapted to engage and support the platform and to move with the platform as the flexural member yields in response to a load placed on the platform;
    2. a second structure engaging the supporting surface and being essentially unyieldable;
    3. auxiliary means for preventing relative rotation between said first and second structures during relative movement of said structure in response to an applied load;
    4. a force carrying structure interconnecting said first and second structures, said force carrying structure being connected to said first structure by a first resilient pivot point means capable of permitting relative rotation therebetween about a first axis parallel to the plane of the platform, and said force carrying structure being connected to said second structure by a second resilient pivot joint means capable of permitting relative rotation therebetween about a second axis parallel to said first axis;
  b. first torque transmitting means interconnecting said force carrying structures of a first and second of said flexural members which are so positioned and arranged that the rotation of said force carrying structures in response to an applied load occurs along a common axis and in the same direction;
  c. second torque transmitting means interconnecting said force carrying structures of the third and fourth of said flexural members which are so positioned and arranged that the rotation of said force carrying structures in response to an applied load occurs along a second common axis and in the same direction, said first and second common axes being parallel to each other, but the load-induced rotational deflections thereabout being oppositely directed;
  d. beam means rigidly connected at its opposite ends to said first and second torque transmitting means, said beam means being resiliently yieldable in proportional response to the load-induced rotation of the torque transmitting means;
  e. whereby each of said torque transmitting means functions to sum the load-induced rotational deflection of the associated force carrying structures, and said beam means yields in proportional response to the combined deflection of both torque transmitting means, thereby to permit measurement of the applied load by means responsive to the yielding of said beam.

9. The flexural member of claim 8 wherein said auxiliary means comprises a first pair of spaced flexure elements each connected at its opposite ends of said first and second structures, said first pair of flexure elements being substantially rigid in a direction parallel to said mutually perpendicular direction but being readily resiliently yieldable in a direction parallel to said first axis, thereby to establish in coaction with said first and second structures a four-sided structure which responds to applied forces or moments to be measured as a parallelogram with pivot connections between the sides.

10. The flexural member of claim 9 wherein said first and second resilient pivot joint means each comprise a flexure element, thereby providing a second pair of spaced flexure elements.

11. The flexural member of claim 10 wherein said second pair of spaced flexure elements are so constructed and arranged that the effective distance therebetween can be readily modified by removal of material, thereby changing the sensitivity of the flexural member.

12. The flexural member of claim 10 wherein said first and second structures, said force carrying structure, said first and second pair of flexural elements are all formed as a single integral unit.

13. A platform weighing system of the type characterized by a platform adapted to receive an object to be weighed, the platform spaced above an unyieldable supporting surface by a plurality of coplanarly arranged flexural members, comprising:
  a. each of said flexural members comprising:
    1. a first structure adapted to engage and support the platform and to move with the platform as the flexural member yields in response to a load placed on the platform;
    2. a second structure engaging the supporting surface and being essentially unyieldable;
    3. auxiliary means for preventing relative rotation between said first and second structures during relative movement of said structures in response to an applied load;
    4. a force carrying structure interconnecting said first and second structures, said force carrying structure being connected to said first structure by a first resilient pivot point means capable of permitting relative rotation therebetween about a first axis parallel to the plane of the platform, and said force carrying structure being connected to said second structure by a second resilient pivot joint means capable of permitting relative rotation therebetween about a second axis parallel to said first axis;
  b. force transfer means interconnecting said force carrying structures of each of said flexural members and adapted to resiliently yield in proportional response to the combined deflections thereof, thereby to permit measurement of the applied load by means responsive to the yielding of said force transfer means.

* * * * *